(12) United States Patent
Caretta

(10) Patent No.: US 6,766,839 B2
(45) Date of Patent: Jul. 27, 2004

(54) TIRE FOR VEHICLE WHEELS WITH IMPROVED BEAD STRUCTURE

(75) Inventor: Renato Caretta, Gallarate (IT)

(73) Assignee: Pirelli Pneumatici S.p.A., Milan (IT)

( * ) Notice: Subject to any disclaimer, the term of this patent is extended or adjusted under 35 U.S.C. 154(b) by 373 days.

(21) Appl. No.: 09/874,298

(22) Filed: Jun. 6, 2001

(65) Prior Publication Data

US 2002/0026975 A1 Mar. 7, 2002

Related U.S. Application Data

(63) Continuation of application No. PCT/EP99/09157, filed on Nov. 22, 1999.
(60) Provisional application No. 60/119,925, filed on Feb. 12, 1999.

(30) Foreign Application Priority Data

Dec. 7, 1998 (EP) ............................................. 98830736

(51) Int. Cl.$^7$ .............................. B60C 3/00; B60C 9/08; B60C 15/00; B60C 15/04; B60C 15/05
(52) U.S. Cl. ...................... 152/454; 152/539; 152/540; 152/545; 152/548; 152/550; 152/552; 156/110.1; 156/123; 156/133
(58) Field of Search ................................ 152/550, 552, 152/540, 545, 539, 548, 454; 156/110.1, 123, 133

(56) References Cited

FOREIGN PATENT DOCUMENTS

| DE | 2408474 | 8/1975 |
|---|---|---|
| DE | 3437761 A1 | 4/1986 |
| DE | 3631736 A1 | 3/1988 |
| EP | 0467277 A1 | 1/1992 |
| EP | 0664231 A1 | 7/1995 |
| FR | 408540 | 3/1910 |
| FR | 1256432 | 2/1961 |
| FR | 1515950 | 1/1968 |
| GB | 2 135 253 A | 8/1984 |

*Primary Examiner*—Adrienne C. Johnstone
(74) *Attorney, Agent, or Firm*—Finnegan, Henderson, Farabow, Garrett & Dunner, L.L.P.

(57) ABSTRACT

A tire for vehicle wheels includes a carcass, a tread strip, and a belt structure. The carcass has a central crown portion and two axially opposite sidewalls terminating in a pair of beads. Each bead includes at least one circumferentially unextendable annular reinforcing core having a series of spirals of metal wire radially superimposed and axially arranged alongside each other. The carcass has a reinforcing structure including at least one ply of rubberized fabric reinforced with metal cords lying in radial planes containing an axis of rotation of the tire. The reinforcing structure includes ends secured to the annular reinforcing cores and a neutral profile, lying in a radial cross-sectional plane, axially extending from bead to bead. The neutral profile intersects a cross section of a zone enclosing the annular reinforcing cores and has a continuous curvature devoid of inflection points along an extension between the beads.

15 Claims, 4 Drawing Sheets

TIRE FOR VEHICLE WHEELS WITH IMPROVED BEAD STRUCTURE

CROSS-REFERENCES TO RELATED APPLICATIONS

This application is a continuation of International Patent Application No. PCT/EP99/09157, filed Nov. 22, 1999, in the European Patent Office; additionally, Applicants claim the right of priority under 35 U.S.C § 119(a)–(d) based on patent application No. 98830736.9, filed Dec. 7, 1998, in the European Patent Office; further, Applicants claim the benefit under 35 U.S.C. § 119(e) based on prior-filed, copending provisional application No. 60/119,925, filed Feb. 12, 1999, in the U.S. Patent and Trademark Office; the contents of all of which are relied upon and incorporated herein by reference.

BACKGROUND OF THE INVENTION

1. Field of the Invention

2. Description of the Related Art

The present invention relates to tyres for motor vehicles and more specifically to their beads, i.e. those annular carcass zones which serve mainly to fix the tyre onto the corresponding mounting rim.

More precisely the abovementioned invention relates to the system for joining together the annular reinforcing structures contained inside said beads, more commonly referred to by the name of "bead cores", and the ends of the carcass ply or plies.

A tyre traditionally comprises a toroidally shaped carcass having a central crown zone connected at its ends to a pair of axially opposite sidewalls which extend radially inwards and each terminate in a bead intended to fix the tyre to a corresponding mounting rim. For this purpose, the abovementioned reinforcing bead core is incorporated inside the bead.

The crown of said carcass has, coaxially arranged on it, a tread strip which is intended for the rolling contact of the tyre on the ground and is provided with a raised pattern defined by incisions and grooves which are formed in the thickness of said strip and are designed to ensure the handling properties of the tyre during use.

The reinforcing structure of the carcass comprises at least one ply of rubberized fabric consisting of a rubber sheet inside which textile or metal reinforcing cords are embedded, said cords being arranged transversely with respect to the circumferential direction of the tyre: in radial-carcass tyres the direction of the abovementioned cords is perpendicular to said circumferential direction, i.e. to the equatorial plane of the tyre.

Whatever the direction of the reinforcing cords, the ends of the carcass ply are folded back axially from the inside towards the outside around the abovementioned bead cores.

Owing to this geometrical arrangement, the profile of the carcass ply along the cross section of the tyre, and therefore also the profile of the corresponding reinforcing cord in radial-type carcasses, has an inflection point at the axially internal and radially external edge of the bead core, where the curvature of the abovementioned profile is reversed, changing from concave, along the sidewall, to convex, around the bead core.

In the continuation of the present description the abovementioned inflection point will be called the "K point".

When the carcass is of the radial type, it also comprises a belt structure arranged on the crown of the carcass, being located between carcass and tread strip and extending from one side to the other of the tyre, i.e. is substantially as wide as the tread strip.

The abovementioned structure traditionally comprises one or more pairs of strips of rubberized fabric provided with reinforcing cords which are parallel to one another in each strip and intersecting those of the adjacent strips, being inclined preferably in a symmetrical manner with respect to the equatorial plane of the tyre.

The tyre mounting rims have, at their axial ends, two more or less conical coaxial surfaces which form the support base for the tyre beads. The axially external edge of said bases terminates in a flange which extends radially outwards and acts as a support for the axially external surface of the bead and against which the abovementioned bead is kept pressed by the inflation pressure of the tyre.

The forced engagement of the tyre bead inside its seat is ensured by the conicity of the support base, which is open outwards, together with the metal reinforcing bead core, which is unextendable circumferentially and therefore has a constant diameter and is contained in the bead of the tyre: this forced engagement, which is produced by the axial thrust exerted on the side of the beads, axially from the inside towards the outside, by the inflation pressure of the tyre, ensures the stability of the tyre bead on the rim during use and, in the case of tubeless tyres, also airtightness between the tyre and rim so as to prevent gradual deflation of the tyre.

In order to guarantee fully this airtightness, the tubeless tyre is mounted on so-called drop center rims, i.e. rims made as one piece with bead support bases which have a high degree of conicity, i.e. are inclined at 15° relative to the axis of rotation of the rim.

This particular inclination of the bead bases means that the tyre must have a particular profile of the carcass ply, distinguished by a tangent to said profile at the K point which is very inclined with respect to the axis of rotation of the rim.

All the above having been stated, the tyres to which the invention preferably relates are tubeless tyres for road transportation which have a metal, radial, single-ply carcass and which are used with working pressures of the order of eight bar.

In these tyres the bead zone is a structurally very critical area which very often results in disuse of the tyres owing to structural weakness in this zone well before the tread has become completely worn.

Many attempts have already been tried in the art in order to improve the situation, without, however, succeeding in solving the problem: these include, in particular, modification of the cross section of the bead core and that of the steel wire from which the bead core is made, if necessary also in combination with one another, in order to provide the bead core with greater torsional rigidity, as well as modification of the profile of the carcass ply and the attempt to optimize the value of the radial height of the folded-back portions of the carcass ply.

All these attempts have been unable to provide a completely satisfactory solution and have often given rise to problems which are even more serious than those which they were intended to solve.

In particular, the increase in torsional rigidity of the bead core has resulted in the simultaneous increase in its flexural rigidity, making mounting and removal of the tyre onto/from the rim extremely difficult: in turn, modification of the profile of the carcass ply has had a negative effect on many behavioural characteristics of the tyre during use.

According to Applicants' perceiving the high inflation pressure not only induces in each cord of the carcass a pulling force which is transmitted onto the bead core along two components which are perpendicular to one another, i.e. an axial component and radial component, and which are opposed by the circumferential non-deformability of the bead core, but also applies to the bead core a twisting torque due to the distance of the K point from the center of mass of the bead core.

This twisting torque, during use of the tyre, varies with each rotational cycle of the tyre, producing cyclical microscopic movements in the whole structure of the bead and in particular microscopic rotations of the bead about its axially external edge and the edge of the flange, which result in the more or less rapid end of the life of the tyre.

SUMMARY OF THE INVENTION

It has been found that the problem may be advantageously overcome by causing the neutral profile of the carcass plies to pass inside the bead core, preferably through its center of mass, thus eliminating the inflection point.

The present invention relates to a new bead structure, in particular for giant-size tubeless tyres, which offers all the advantages of flexibility, elastic deformability and mechanical strength of the known beads, but which is devoid of the disadvantages illustrated hitherto.

The present patent also relates to a new bead structure which provides the tyre with a greater endurance.

Moreover the present patent relates to a new bead structure which provides the tyre with a smaller rolling resistance.

A different object of the present patent is a new bead structure which provides the tyre with a greater load capacity compared to known tyres which have the same dimensions.

A further different object of the present patent is a new bead structure which simplifies the tyre manufacturing process and allows the use of less costly machines.

Another different object of the present patent is a method for increasing the load capacity of a tyre for vehicle wheels compared to known tyres of the same size.

Another different object of the present patent is a method for eliminating the twisting torque, in the plane of the radial cross section, applied to the annular bead reinforcing cores in a tyre for vehicle wheels.

According to a first aspect thereof, the invention therefore relates to a tyre for vehicle wheels, comprising a torus-shaped carcass which has a central crown portion and two axially opposite sidewalls terminating in a pair of beads for fixing the tyre onto a corresponding mounting rim, each bead comprising at least one circumferentially unextendable annular reinforcing core, a tread strip which is located on the crown and coaxially extends around said carcass and is provided with a raised pattern for rolling contact with the road, and a belt structure coaxially arranged between said carcass and said tread strip, said carcass being provided with a reinforcing structure essentially consisting of at least one ply of rubberized fabric which is reinforced with metal cords lying in radial planes containing the axis of rotation of the tyre, said reinforcing structure having its ends secured to said annular reinforcing cores, and a neutral profile, in a radial cross-sectional plane, axially extending from bead to bead, characterized in that said neutral profile intersects the cross section of the zone which encloses said annular reinforcing cores and in that the ends of said reinforcing structure extend radially inwards not beyond the radially innermost profile of said annular reinforcing cores.

According to a second aspect thereof, the invention relates to a method for increasing the load capacity of a tyre for vehicle wheels, provided with a conventional carcass structure as described above, said method comprising the steps of limiting the radial extension inwards of the ends of the carcass structure so that they do not extend beyond the radially innermost profile of the annular bead-reinforcing cores, and of causing the neutral profile of the carcass plies to intersect the cross section of the zone which encloses said annular reinforcing cores.

According to a further aspect thereof, the invention relates to a method for eliminating the twisting torque, in the plane of the radial cross section, which is applied to the annular bead-reinforcing cores in a tyre for vehicle wheels as described above, said method comprising the steps of eliminating the inflection points along the extension of the neutral profile of the carcass reinforcing structure, and of causing said neutral profile to intersect the cross section of the zone which encloses said annular reinforcing cores.

BRIEF DESCRIPTION OF THE DRAWINGS

In any case, the present invention will be better understood now with the aid of the description which follows and the accompanying drawings, both of which are provided solely by way of a non-limiting example and in which.

DETAILED DESCRIPTION OF THE PREFERRED EMBODIMENTS

Figure 1:
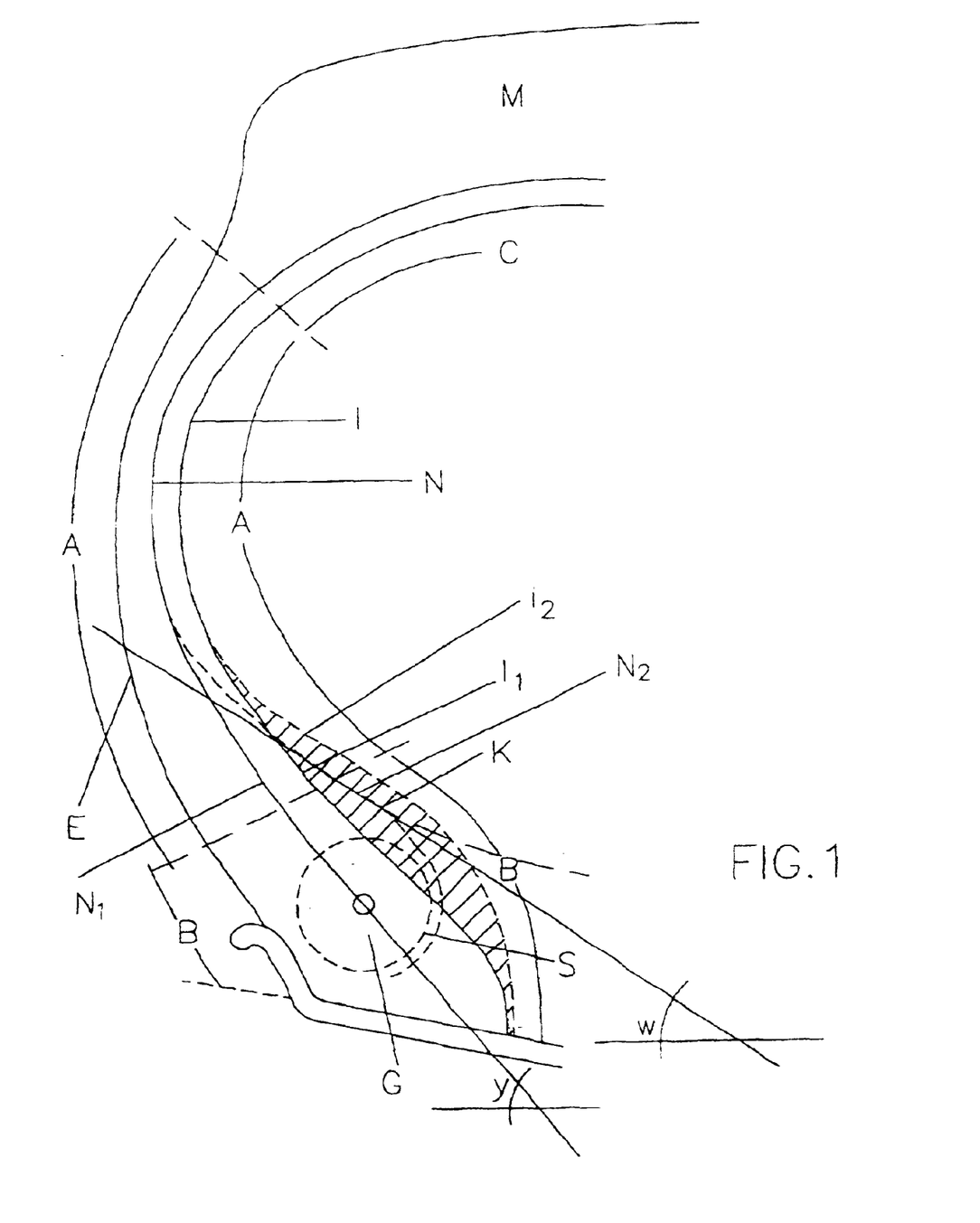
FIG. 1 shows, in partial cross section and in schematic form, the path of the neutral profile of the carcass plies of the tyre according to the invention, compared with that of the known art.

FIG. 1 therefore shows, in partial cross section and in schematic form, a tyre according to the invention with specific reference to the paths of its contour profiles and the neutral profile of the carcass plies, compared to the corresponding profiles of the tyre according to the known art.

The tyre comprises a torus-shaped carcass which has a central crown portion C and two axially opposite sidewalls A, each terminating in a bead B for fixing the tyre onto a corresponding mounting rim. The bead incorporates internally at least one circumferentially unextendable annular reinforcing core, which is usually referred to as a "bead core" and in respect of which the present figure shows only the center of mass G and the profile S of the zone containing its cross section.

On the crown of the carcass, coaxially extending around it, there is arranged a tread strip M which is provided with a raised pattern for rolling contact with the road, not illustrated in that it is of little relevance for the purposes of the invention, and which determines the handling of the tyre during use in particular as regards the tractional capacity, the is road-holding performance and the resistance to aquaplaning.

The carcass is provided with a reinforcing structure comprising at least one ply of rubberized fabric reinforced with textile and/or metal cords which form the reinforcing element extending from bead to bead and secured to the abovementioned bead cores.

Only the profile N of this structure is shown, as will be seen below.

The profile E indicates the external contour of the tyre, which is common both to the tyre of the invention and to that which is known, in order to illustrate better the comparison between the tyre according to the invention and the known tyre using equivalent tyres with the same maximum overall dimensions and the same size.

The profiles $I_1$, and $I_2$ indicate the internal tyre profile for the tyre according to the invention and the known tyre, respectively, which are spaced from one another in the radially internal portion of the sidewall and in the bead.

The profiles $N_1$ and $N_2$ indicate the profile of the carcass ply or plies, for the tyre according to the invention and the known tyre, respectively, which are also spaced from one another in the radially internal portion of the sidewall and in the bead.

As regards the tyre of the known type, the profile $N_2$ has along its extension, in the region of the bead, an inflection point K where, owing to winding of the carcass plies around the bead core, the curvature of the profile changes direction, becoming outwardly concave instead of inwardly concave. More particularly, the K point is located at the axially internal end of the bead core and sometimes more specifically substantially at the axially internal and radially external edge of the bead core. The tangent to the profile $N_2$ at the point K has an angle of inclination "w" which is relatively small with respect to the axis of is rotation of the tyre, being by way of a rough guide between 20° and 35°.

The profile $N_1$ of the tyre according to the invention instead passes inside the zone which contains the cross section of the bead core, or the group of bead cores, forming the bead reinforcement, and preferably passes through the center of mass G of the bead core or of the abovementioned group of reinforcing bead cores; for the sake of convenience, the reference zone is taken as being that delimited by a curved line S which passes through the vertices of the bead core or cores and which minimizes the value of the area of the zone, i.e. the circumscribed area.

FIG. 1 clearly shows how the abovementioned profile $N_1$ is devoid of the K point, does not have reversals in curvature along its extension and has an inclination "y" with respect to the axis of rotation of the tyre, which is defined by the inclination of the tangent to the profile $N_1$ passing through the center of mass G, which is markedly greater than that of the tangent passing though the abovementioned K point in the known tyres.

In the following of the present description, reference will be made to the neutral profile of the carcass plies: in fact, this profile coincides with the profile of said plies when the latter are in mutual contact, but diverges therefrom when the plies move away from one another. In this case the neutral profile corresponds to the profile of the neutral axis of the assembly externally delimited by two or more carcass plies and incorporating internally further filling or reinforcing elements such as compounds and/or fibers, yarns, threads or cords made of textiles or metal or other suitable material.

It is worth recalling here that the profile of the carcass plies is commonly referred to in technical literature by the term "ply line"; the portion of said profile, which is deformed upon variation in the load and the inflation pressure of the tyre providing the tyre with load capacity and vertical resilience, is commonly indicated in technical literature by the term "ρy" and corresponds substantially to the portion of the ply line radially outside the K point. The "ρy" is also referred to here as the "active profile".

It is immediately apparent from FIG. 1 how the neutral profile of the carcass plies according to the invention allow a substantial reduction in the thickness of the bead and a widening of the active profile as far as the center of mass of the bead core. This reduction in thickness, i.e. the elimination of the hatched bead portion in the figure not only increases the volume of air contained in the tyre by a quantity approximately between 2% and 5%, but concentrates this increase in the radially innermost portion of the tyre. The result is the displacement of the volumetric center line of the tyre towards the axis of rotation of the rim with a corresponding increase in the load capacity of the tyre itself, conditions being equal with the equivalent tyre of the art.

The streamlining of the bead produces, per se, a reduction in the weight of the tyre and its operating temperature owing to the smaller quantity of material subject to the cyclical deformations associated with the rolling movement of the tyre.

Figures 2, 6:
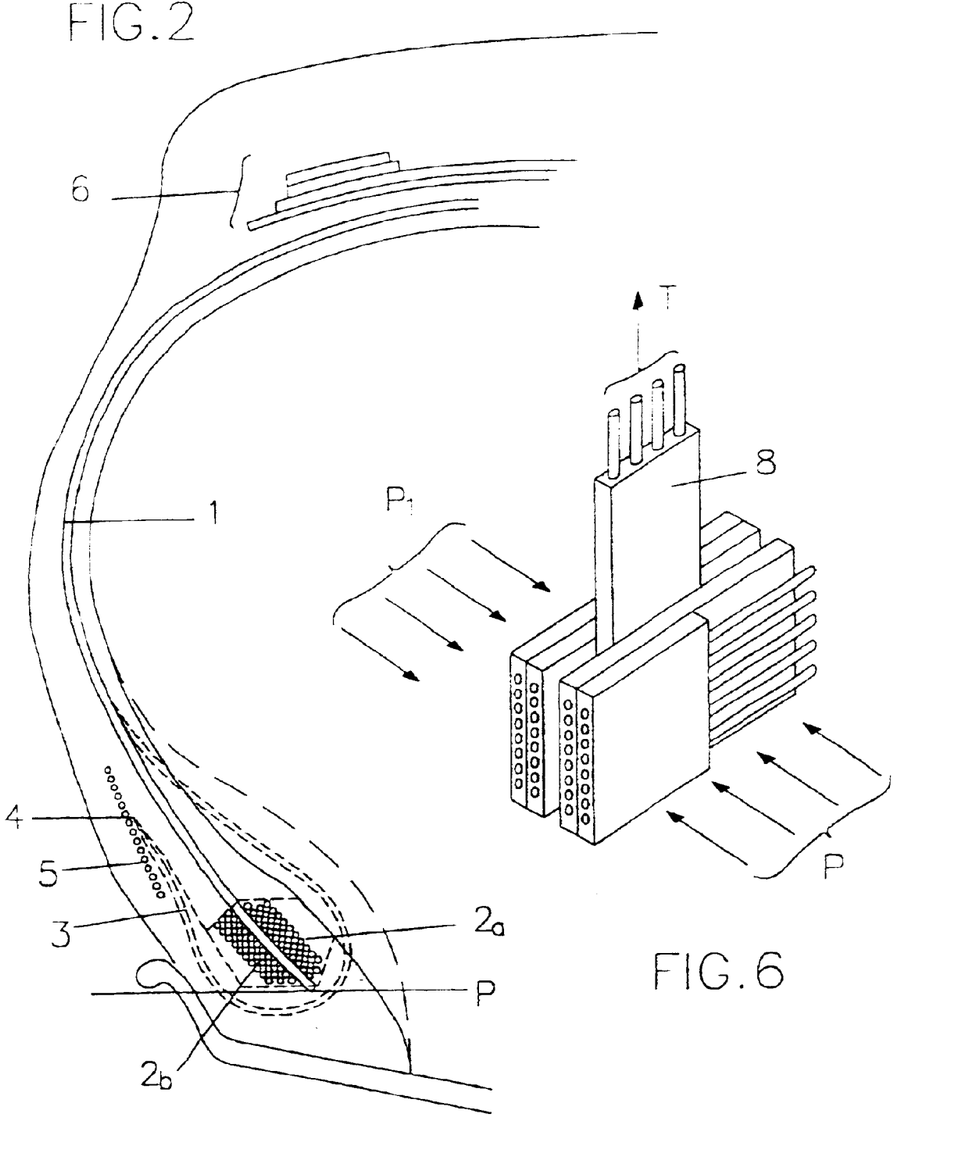
FIG. 2 shows, in partial cross section and in schematic form, a first embodiment of a carcass structure of the tyre according to the invention, still compared with that of the known art.
FIG. 6 shows a bead model according to the invention to which all the unitary forces which are transmitted onto the tyre bead during use of the tyre have been applied.

FIG. 2, shows, still in partial cross section and in schematic form, a first embodiment of a carcass structure of the tyre according to the invention, still compared with the equivalent carcass structure (shown in broken lines) of the known art.

In addition to that already explained and illustrated with reference to FIG. 1, the tyre according to the invention comprises a carcass ply 1, reinforced with metal cords arranged radially, i.e. lying substantially in the plane of the cross section of the tyre. The carcass ply 1 may consist of a single sheet of rubberized fabric or a group of several sheets or a series of bands suitably arranged as described below.

The end of the abovementioned ply is inserted between two bead cores 2a and 2b which together form the annular reinforcing core of the tyre bead. Preferably the end of the ply does not project from the bead core radially inwards, i.e. does not extend radially inwards beyond the radially innermost profile "p" of the bead core or group of bead cores, and therefore cannot even be folded around a bead core, contrary to the known structures where the end 3 rotating axially from the inside towards the outside encompasses the bead core 2 and rises up radially outwards along the side of the carcass ply, causing a structural discontinuity in the bead at the height of the lip 4 of the abovementioned fold.

The effect of this discontinuity has to be usually offset by means of the insertion of a textile or metal side-piece 5 radially extending on both sides of said lip.

The elimination of the fold of the carcass ply around the bead core, both from the inside towards the outside and vice versa, simplifies the tyre manufacturing process and eliminates an important source of negative consequences.

In one particular embodiment, the carcass according to the invention also comprises a belt structure 6 which is coaxially arranged on the crown of the carcass and located between the abovementioned carcass and the tread strip M.

Figure 3:
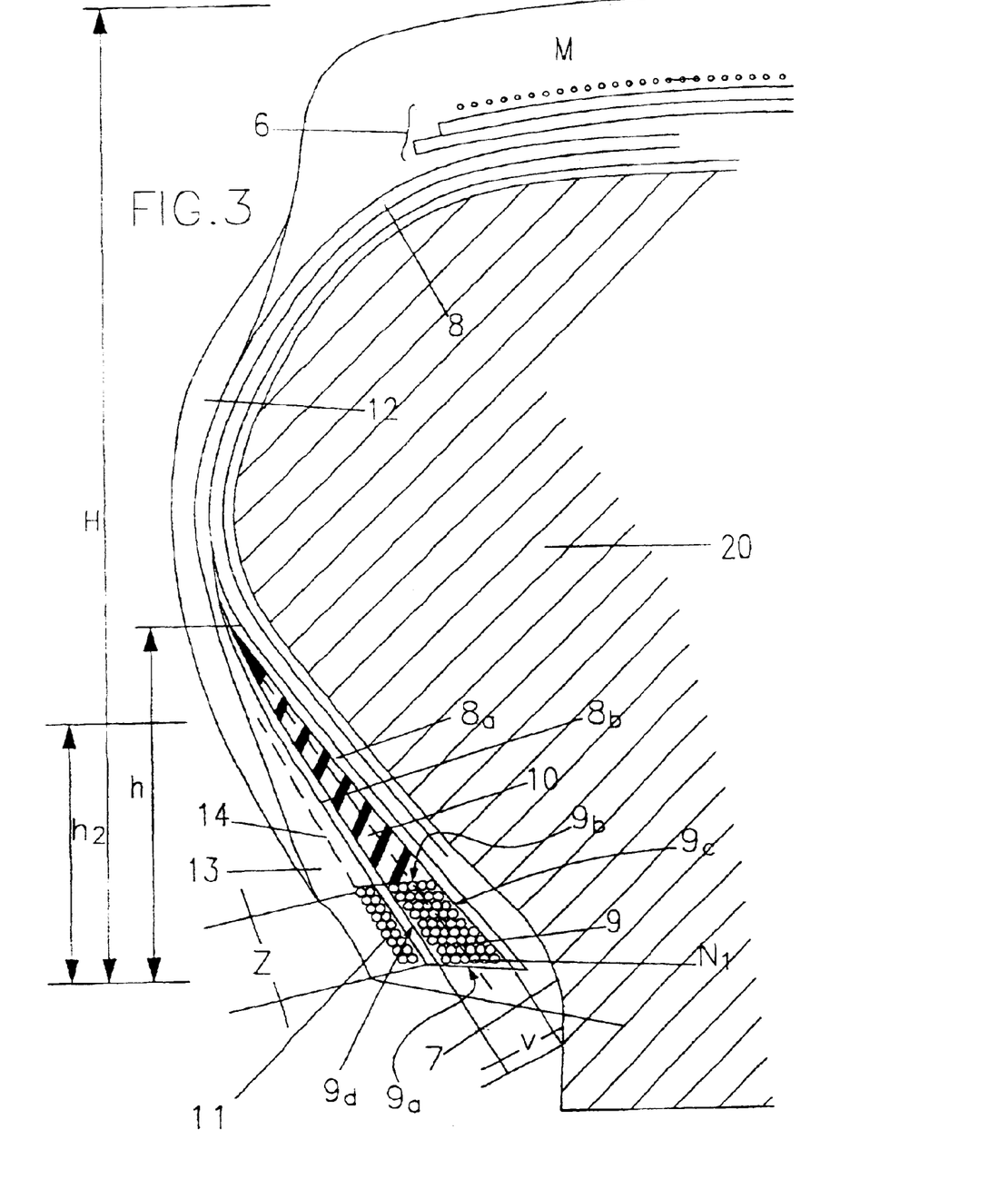
FIG. 3 shows, in partial cross section, a second preferred embodiment of the carcass structure of the tyre according to FIG. 1.

FIG. 3 shows a preferred embodiment of the tyre according to the invention, which has been constructed using the technology described in the co-pending European patent application filed by the same Applicants under No. EP 97-830731.2.

The internal components of the tyre are placed on a torus-shaped male drum 20, the external profile of which coincides with that of the radially internal surface of the unprocessed tyre, starting with the so-called liner 7, i.e. a sheet of rubber which, in the vulcanized tyre, forms the internal airtight surface of the tyre.

The carcass ply is then constructed by placing on the liner, in circumferential succession, a plurality of bands 8, i.e. strips of rubberized fabric each containing a certain number of steel cords, said bands being arranged spaced from one another with a widthwise interval preferably equal to the width of the band, with the cords arranged radially, i.e. at 90° with respect to the circumferential direction of the male drum. The bands are fixed to the liner over the whole of their longitudinal extension, extending from bead to bead along the external surface of the male drum.

Preferably the bands have a width of between 3 and 15 mm (even more preferably between 5 and 10 mm), a thickness of between 0.5 and 2.5 mm, and contain a number of cords ranging between 2 and 15 (even more preferably between 3 and 10), with a density of preferably between 4 and 8 cords per centimeter, measured on the carcass ply, in the circumferential direction, in the vicinity of the equatorial plane of the tyre 1.

Preferably the cords are arranged in the bands 8 at a mutual interaxial distance of not less than 1.5 times the diameter of the cords, so as to allow adequate rubberization between the adjacent cords.

However, if required, the cords may advantageously be arranged in the bands also with a greater density, so as to provide the carcass ply with particular properties of compactness and homogeneity.

The cords are those which are usually used in the preparation of tyre carcasses, preferably with a diameter of between 0.3 mm and 2.1 mm. For the preparation of a prototype tyre of size 315/80 R 22.5" the Applicants have found it convenient to use metal cords with the composition 3+9+15×0.22.

A reinforcing bead core 9 is now applied onto this first series of bands, in the region of the bead, together with, in a position radially outside said bead core, a triangular-shaped filling body 10 which is tapered towards the opposite end of the bead core, radially extending outwards over a radial eight "h" which is preferably between 10% and 50% of the height of the section H of the tyre.

The bead core 9 may be constructed separately, on a suitable preparation drum, and then assembled on the carcass under construction, or may be constructed directly on the male drum, above the abovementioned bands, in the region of the bead.

Preferably, the bead core comprises a metal annular core which is circumferentially unextendable and consists of a series of spirals of metal wire which are radially superimposed and axially arranged alongside each other.

The series of spirals may be formed by winding onto a suitable drum, in the form of several spirals radially superimposed on one another, a wire or a strip of metal wires arranged alongside each other, or by arranging alongside each other, in succession, a plurality of metal spirals which are made by winding about itself, in radially superimposed spirals, a single metal wire, or also by superimposing radially with respect to one another a plurality of metal layers which are formed by winding, in spirals axially arranged alongside each other, a single metal wire.

It should be noted that, owing to the fact that the neutral profile of the carcass plies passes inside the zone which encloses the cross section of the bead core, and more specifically through the center of mass of the bead core itself, the latter is no longer subject to a twisting torque, so that it merely has to withstand tractional forces applied to its cross section.

As a result, the bead core is no longer required to have a specific torsional strength, and therefore characteristics such as non-deformability of its cross section or inclination of the radially internal surface of the bead core at an angle substantially equal to that of the bead seat on the rim become less important.

This fact results in a considerable freedom of choice in the form of the cross section of the bead core and the wire forming it.

As regards the cross section of the bead core 9, in the embodiment described, the latter is preferably formed with an irregular trapezoidal shape, comprising two bases, respectively consisting of the radially internal surface 9a and the radially external surface 9b, and two inclined sides, respectively consisting of the axially internal surface 9c and the axially external surface 9d. The base 9a is inclined with respect to the axis of rotation of the tyre at an angle substantially equal to that of the bead base on the rim, i.e. of the order of 15°, but may also have a smaller inclination, preferably of between 0° and 12°, so as to favour the forced engagement of the bead onto the corresponding seat. According to another preferred aspect, the angle of inclination of the axially external and axially internal sides of said trapezium with respect to the axis of rotation of the tyre is respectively greater than and less than the angle of inclination of the neutral profile of the carcass plies in is the region of said sides.

Of particular importance are the linear dimensions of the bead core 9, i.e. the extension (z) in the longitudinal direction (inclined sides) and axial thickness (v) (radial bases) in the transverse direction, shown in FIG. 3; preferably the dimension z is between 10 and 25 mm, while the dimension v is between 7 and 20 mm.

The material of the bead core may be any textile or metallic material, or any material of another kind, which has suitable mechanical strength characteristics; preferably this material is normal steel wire or high carbon-content (high tensile) steel wire, commonly used in tyre technology, or a metal cord with a corresponding load capacity and strength.

In the case where metal wire is used, its cross section is preferably circular, with a diameter of between 0.3 and 2.1 mm; alternatively a flat metal strip may be used, preferably with a substantially rectangular cross section, with sides having dimensions ranging between 1.5 and 2.5 mm, preferably with rounded edges.

In a different embodiment, the flat strip may have a substantially hexagonal cross section for example as described in U.S. Pat. No. 5,007,471 in the name of the same Applicants.

In the case where a metal cord is used, the Applicants have found it advantageous to use the cord 7×4×0.28, i.e. a cord consisting of seven strands of four wires each, each wire having a diameter of 0.28 mm.

Preferably the metal elements (wires or strips) which form the spirals of the bead core 9 are bare, i.e. not lined with rubber; in this case, each metal element retains the possibility of effecting small circumferential displacements with respect to the adjacent metallic elements, thus maximizing the flexibility of the bead core, also in the case of axial interconnection between the sections of the adjacent strips, and hence the possibility of ovalization of the bead wire during mounting of the tyre onto the rim.

A new series of bands 8b are now placed in the spaces left between the bands 8a arranged in position previously: the ends of these bands are superimposed in a position axially outside the bead core already assembled on the male drum, such that the bead core is arranged between two layers of carcass cords. In particular, in the region of the beads, the bands are positioned alternately against the axially opposite sides of the bead core: the bands of the first series are axially internal, the bands of the second series are axially external and not located opposite those of the first series. In other words, the carcass thus formed behaves in the manner of a radial single-ply carcass on the crown and along the radially external center line of the side wall, and as a dual-ply carcass along the radially internal center line of the sidewall and in the region of the beads. In this way the carcass according to the invention embraces all the advantages of single-ply carcasses in terms of lightness, comfort and flexibility and all the advantages of dual-ply carcasses in terms of structural strength, vertical and torsional rigidity of the beads, and stability in the presence of lateral displacement forces.

In a first embodiment, all the bands are identical to one another, i.e. have the same number and the same type of reinforcing cords. However, it may be convenient to vary the characteristics of the bands secured in a position axially inside the bead core from those secured in a position axially outside the bead core: in a first variant, the so-called axially internal bands have a different width, preferably greater than the so-called axially external bands such that, for the same density of the cords in the bands, the cords axially inside the bead core are greater in number than the axially external cords, while maintaining a uniform density within the carcass ply.

In a second variation of embodiment, the cords axially inside the bead core are instead of a different type, i.e. are preferably stronger, compared to the axially external cords; it will be clear that in this case the carcass ply will have, on its crown, a periodic circumferential variation in uniformity, which if necessary can be restored by modifying the density of the cords in the various bands.

In yet another alternative variation of embodiment, the bead of the tyre according to the invention has a second reinforcing bead core 11, which is preferably arranged axially outside the carcass bands in an axially external position. Preferably this second bead core comprises a circumferentially unextendable annular insert which is formed substantially in the manner of a circular rim concentric with the axis of rotation of the tyre and located in an axially external position against the end portions of the abovementioned bands.

This annular insert is composed of at least one elongated metal element wound in several substantially concentric spirals. The spirals may be defined by a continuous spiral or by concentric rings formed by respective elongated metal elements.

In a different embodiment, the annular insert has the same form, possibly with different dimensions, as the trapezoidal bead core in an axially internal position.

The neutral profile of the carcass ply, which coincides with that of the ply in the portion where the bands follow the same trajectory, moves away from the bands when these separate from each other, at the radially external end of the filling body, and passes between the two series of bands, inside the area which encloses the cross section of the bead core or of the two bead cores described above, and more preferably passes through the center of mass of the bead core or of the group of bead cores: in this way the active profile of the carcass continues radially inwards as far as a point in the immediate vicinity of the bead core.

The carcass is then completed with the arrangement of the belt structure 6, the sidewalls 12 and the tread strip M, and is then molded and vulcanized: if necessary owing to particular requirements, the structure of the bead may comprise other reinforcing elements such as textile fabric and/or metal strips in an axially internal and/or external position and/or fillets of blend with particular characteristics, such as for example, an anti-abrasive fillet 13 in an axially external position which protects the tyre bead from rubbing against the rim shoulder.

For example, it may comprise a reinforcing edge 14 consisting of a strip of rubberized fabric reinforced with cords made of any material, preferably metallic material. The cords are arranged in the rubberized fabric at an angle with respect to the radial direction of the tyre of between 0° and 60°, and more preferably between 15° and 25°. The height $h_2$ of the reinforcing edge is preferably between 15% and 35% of the height of the section H of the tyre.

In another alternative embodiment of the present invention, the bands of the first series are positioned alongside each other or are spaced with an interval equal to the smallest width of the width of the bands of the second series. The positioning of these second bands is performed by superimposing them entirely on top of the underlying bands, thus resulting in a dual carcass ply also on the crown and in the radial external portion of the sidewalls. In this case it is possible to obtain greater strength of the carcass against the increase in weight of the tyre. With this solution it is also possible to arrange the radially superimposed bands with the reinforcing cords of the first series intersecting those of the second series and if necessary at different angles of inclination to one another with respect to the circumferential direction.

In this embodiment of the present invention it is advantageous to vary the thickness, measured circumferentially on the carcass ply in the vicinity of the equatorial plane of the tyre, of the cords in the first series and the second series of bands and in particular to use a greater thickness of cords for the bands 8a of the first series, i.e. those which are radially innermost, with respect to those 8b of the second series. For example, it is possible to use a thickness of 8 cords per centimeter for the first series and 4 cords per centimeter for the second series.

In order to verify the technical validity of the proposed solution, the Applicants have constructed a model of the bead according to the invention, to which all the unitary forces which are transmitted onto the tyre bead during use of the tyre were applied.

Figures 4, 5:
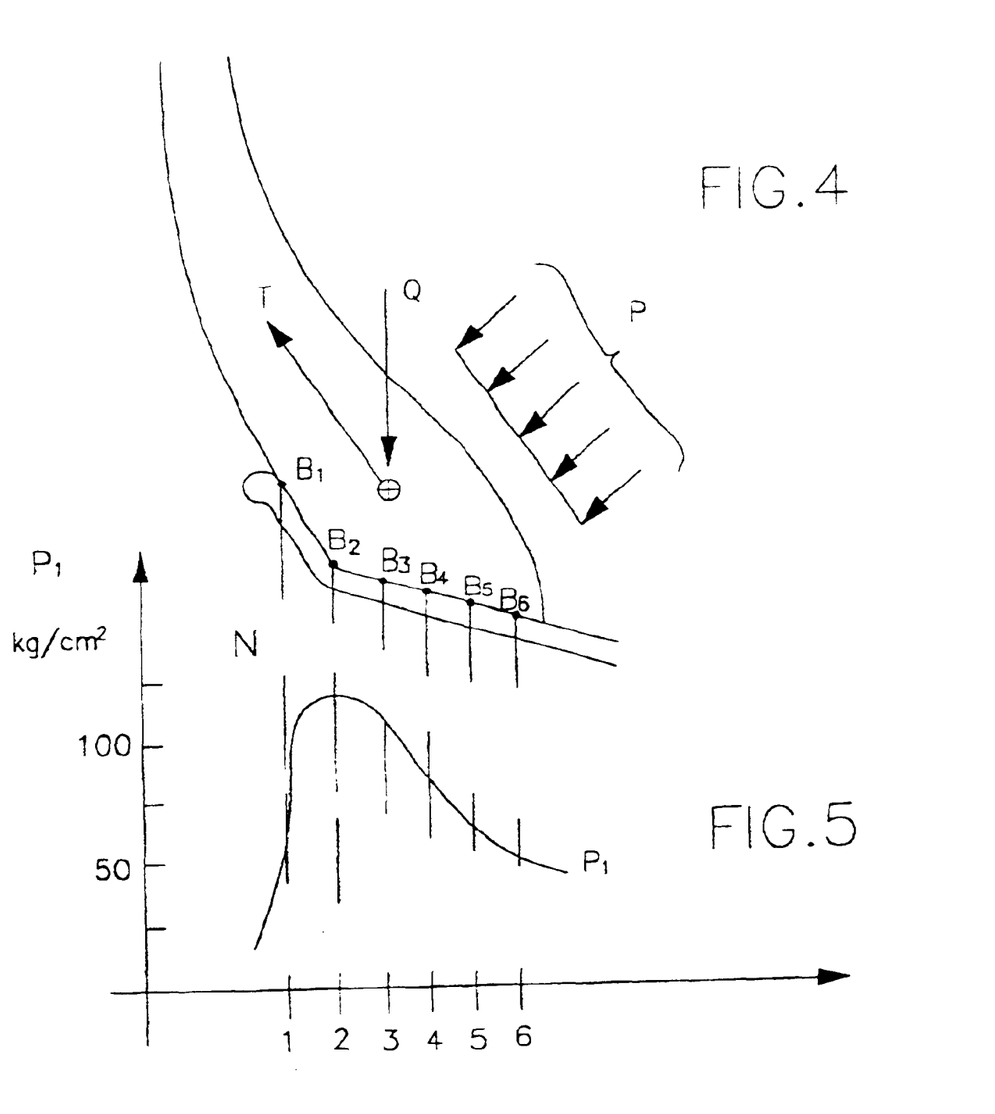
FIG. 4 shows the state of forces acting on the tyre bead, viewed in partial cross section, during use.
FIG. 5 shows the mean progression, pointwise, of the pressure exerted by the tyre bead on the bead seat of the rim.

With reference to FIG. 4 these main forces are:
the force P due to the inflation pressure
the force Q corresponding to the load
the force T due to the pulling force exerted by the carcass ply and more particularly by the reinforcing cords of the carcass ply, owing to the inflation pressure.

These forces, which are indicated overall by P1, are transmitted onto the shoulder of the rim (respectively at the points B1 to B6) and vary cyclically in intensity and in direction during rolling of the tyre under load. The diagram in FIG. 5 shows the mean progression pointwise (from B1 to B6) of the pressure P1 exerted by the tyre bead on the rim shoulder.

These mean forces, which have been measured and calculated for the prototype tyre mentioned above, with the size 315/80 R 22.5", were applied to the model illustrated in FIG. 6, said model having been constructed using the same materials and with the same geometrical form as the abovementioned tyre.

The model was formed with a band 8 of rubberized fabric (length 12 cm, width 1 cm, thickness 2.6 mm) made of the same fabric as the carcass ply and comprising four steel reinforcing cords, with the composition 3+9+15×0.22, which are normally used in the carcass of the tyres of the abovementioned size.

One end of the abovementioned band was enclosed between two retaining elements 15 and 16 each consisting of two strips of rubberized fabric, with a thickness of 2.3 mm and height of 20 mm, reinforced with eight metal cords with the composition 7×4×0.28 which are arranged perpendicularly with respect to the cords of the carcass strip, so as to simulate the bead core as shown in FIG. 2.

The model was vulcanized at the temperature of 190° C. for a duration of 30' and at a pressure of 30 bar.

By means of a vice the two retaining elements were pressed together with a pressure P of 60 bar, equal to the mean value of the pressure with which the tyre bead is pressed against the rim shoulder, while the opposite end of the band was subjected to a tractional force T by means of a clamp to which a tractional load was applied, said load increasing until it caused laceration of the compound between the cords of the band and those of the retaining elements.

The force F which caused the abovementioned laceration was greater than 400 kg and therefore greater than 100 kg per cord.

Since the pulling force T applied to each carcass cord during rolling of the tyre is about 20 kg, it follows that the safety coefficient of the bead structure according to the invention is substantially equal to 5, i.e. completely in line with that normally used during the correct design of the tyres according to the state of the art.

The tyre according to the invention achieves many important advantages, all of which substantially result from the elimination of the twisting torque acting on the rim of the tyres of the known art.

Firstly, the microscopic movements of the tyre bead on the bead base and around the rim shoulder are drastically reduced in magnitude, if not completely eliminated, with a greater working life of the tyre owing to the smaller degree of fatigue of the critical zone of the bead during rotation under load.

A further positive effect in connection with the greater working life of the tyre is obtained as a result of the elimination of the structural discontinuity caused in the known tyres by the presence of the fold of the carcass ply, which is the cause of failures in particular on the edge of the abovementioned fold.

It is worth remembering here that the tyre for heavy load, when worn, must be able to be covered with a new tread strip, at least once, but preferably several times, in view of the impact of this possibility on the operating costs of the vehicle; however this operation is possible only on carcasses which are integral so that the carcasses sent for retreading are examined beforehand and suitably selected. The importance of the invention is clear considering that most of the carcasses discarded prior to retreading are eliminated owing to bead defects.

Owing to its reduced geometrical dimensions, the bead core or the pair of bead cores according to the invention form an annular reinforcing core which is very flexible and therefore capable of being easily deformed, assuming in particular the elliptical (oval) configuration necessary for allowing the bead to pass over the rim shoulder during mounting of the tyre on the rim and, vice versa, removal of the tyre from the rim, said operation being particularly complex in the case of the giant-sized tyres used for road transportation.

In addition to the above, the tyre according to the invention reduces the fuel consumption owing to the smaller rolling resistance achieved as a result of the lower weight of the tyre, since the elimination of a twisting moment applied to the bead allows both the bead core and the overall structure of the bead to be made lighter, with the associated reduction in the hysteretic masses and deformations of the materials which form the abovementioned structure.

The load capacity of the vehicle is also increased since the active profile of the carcass ply is radially extended inwards as far as the center of the bead core with consequent expansion of the toroidal cavity, for the same total volume of the tyre, and lowering of the meridian plane of the toroid towards the axis of rotation of the tyre. It should be remembered here that the load-bearing capacity of the tyre is directly proportional to the volume of the toroidal cavity comprised between the radially external surface of the rim and the abovementioned volumetric meridian plane.

In connection with that, it is now clear that the invention also comprises a method for increasing the load capacity of traditional tyres for vehicle wheels, which are provided with a carcass structure such as that described above.

In accordance with this method, the known process of manufacturing the tyre is modified so as to limit the radial extension inwards of the ends of the carcass reinforcing structure, so that they do not exceed the radially innermost profile of the bead cores, thus making folding back of the carcass ply around the bead cores impossible, and the carcass plies are arranged in an axial position with respect to the bead core such that the neutral profile of the abovementioned plies is made to intersect the cross section of the zone which encloses the bead reinforcing cores.

The simplification of the production process and the associated manufacturing machinery resulting from elimination of folding of the carcass ply around the bead core is a further not insignificant advantage offered by the invention.

Finally, the invention also offers a method for eliminating the twisting torque applied, in the plane of the radial cross section, to the bead cores reinforcing the bead in tyres for vehicle wheels described above, thus resulting in said advantages being achieved, in particular as regards the lower weight of the tyre and smaller rolling resistance.

The abovementioned method differs from the known tyre manufacturing methods since it comprises the steps of eliminating the inflection points along the extension of the neutral profile of the carcass reinforcing structure and causing the abovementioned neutral profile to intersect the cross section of the zone which encloses the annular bead reinforcing cores, i.e. the already much-cited bead cores.

It will also be clear that the person skilled in the art, having now understood the general features of the invention, will be able to make all those structural modifications and variations to critical parameters which, although not expressly described here, may nevertheless be easily deduced from the present description which is provided merely by way of a non-limiting example, without thereby departing from the protective scope of the present invention as claimed hereinbelow.

What is claimed is:

1. A tyre for vehicle wheels, comprising:
    a torus-shaped carcass having a central crown portion and two axially opposite sidewalls terminating in a pair of beads for fixing the tyre onto a corresponding mounting rim, each bead comprising at least one circumferentially unextendable annular reinforcing core comprising a series of spirals of metal wire radially superimposed and axially arranged alongside each other;
    a tread strip located on the crown portion and coaxially extending around the carcass and provided with a raised pattern for rolling contact with a road; and
    a belt structure coaxially arranged between the carcass and the tread strip;
    the carcass having a reinforcing structure comprising at least one ply of rubberized fabric reinforced with metal cords lying in radial planes containing an axis of rotation of the tyre, the reinforcing structure having ends secured to the annular reinforcing cores and a neutral profile, lying in a radial cross-sectional plane, axially extending from bead to bead, wherein:
        the neutral profile intersects a cross section of a zone enclosing the annular reinforcing cores; and
    the neutral profile has a continuous curvature devoid of inflection points along an extension between the beads.

2. The tyre of claim 1, wherein each annular reinforcing core comprises a first axially innermost bead core and a second axially outermost bead core, one end of the at least one ply being inserted between the first and second bead cores.

3. The tyre of claim 1, wherein the at least one ply comprises a plurality of rubberized-fabric bands alternately arranged, in at least one of the beads, on axially opposite sides of a respective annular reinforcing core.

4. The tyre of claim 3, wherein the at least one ply comprises two series of bands radially superimposed at least on the crown portion of the tyre.

5. The tyre of claim 1, wherein the annular reinforcing cores, in a cross-sectional plane, are formed with an irregular trapezoidal shape comprising two bases, a radially internal base and a radially external base, and two inclined sides, an axially internal side and an axially external side.

6. The tyre of claim 5, wherein a first angle of inclination, with respect to the axis of rotation of the tyre, of the axially internal side of the trapezoidal shape is smaller than a second angle of inclination of the neutral profile of the reinforcing structure in a region of the axially internal side, and wherein a third angle of inclination, with respect to the axis of rotation of the tyre, of the axially external side of the trapezoidal shape is greater than the second angle of inclination of the neutral profile of the reinforcing structure in the region of the axially external side.

7. The tyre of claim 5, wherein a longitudinal dimension of the inclined sides of the annular reinforcing cores is between 10 mm and 25 mm, and a transverse dimension of the bases of the annular reinforcing cores is between 7 mm and 20 mm.

8. The tyre of claim 1, wherein the spirals of metal wire comprise steel with a high carbon content.

9. The tyre of claim 1, wherein a cross section of the metal wire is hexagonal.

10. The tyre of claim 1, wherein the annular reinforcing cores comprise a series of radially superimposed spirals of flat metal strip.

11. The tyre of claim 1, wherein the annular reinforcing cores, in a cross-sectional plane, are formed with an irregular trapezoidal shape comprising a radially internal base that is inclined with respect to the axis of rotation of the tyre at an angle substantially equal to, or smaller than, that of a bead base on the rim.

12. The tyre of claim 1, wherein the ends of said reinforcing structure extend radially inwards not beyond a radially innermost profile of said annular reinforcing cores.

13. The tyre of claim 1, wherein it is a giant size tyre.

14. A method for increasing a load capacity of a tyre for vehicle wheels,
    the tyre comprising a torus-shaped carcass having a central crown portion and two axially opposite sidewalls terminating in a pair of beads for fixing the tyre onto a corresponding mounting rim, each bead comprising at least one circumferentially unextendable annular reinforcing core comprising a series of spirals of metal wire radially superimposed and axially arranged alongside each other, the carcass having a reinforcing structure comprising at least one ply of rubberized fabric reinforced with metal cords lying in radial planes containing an axis of rotation of the tyre, the reinforcing structure having ends secured to the annular reinforcing cores and a neutral profile, lying in a radial cross-sectional plane, axially extending from bead to bead, the method comprising the steps of:
        limiting the radial extension inwards of the ends of said reinforcing structure so that they do not extend beyond the radially innermost profile of said annular reinforcing cores;
        causing the neutral profile to intersect a cross section of a zone enclosing the annular reinforcing cores; and
        causing the neutral profile to have a continuous curvature devoid of inflection points along an extension between the beads.

15. A method for avoiding the application of a twisting torque, in a plane of radial cross section, to annular reinforcing cores in a tyre for vehicle wheels, the annular reinforcing cores comprising a series of spirals of metal wire radially superimposed and axially arranged alongside each other, the tyre comprising a torus-shaped carcass having a reinforcing structure comprising at least one ply of rubberized fabric reinforced with metal cords lying in radial planes containing an axis of rotation of the tyre, the reinforcing structure having ends secured to the annular reinforcing cores and a neutral profile, lying in a radial cross-sectional plane, axially extending from bead to bead, the method comprising the steps of:
    avoiding the presence of inflection points along an extension of the neutral profile of the reinforcing structure; and
    causing the neutral profile to intersect a cross section of a zone enclosing the annular reinforcing cores.

* * * * *